United States Patent [19]

Ohta et al.

[11] Patent Number: 4,634,617
[45] Date of Patent: Jan. 6, 1987

[54] OPTICAL MEMORY DISC

[75] Inventors: Kenji Ohta, Yao; Akira Takahashi; Tetsuya Inui, both of Nara; Takao Hyuga, Soraku; Hideyoshi Yamaoka, Matsubara, all of Japan

[73] Assignee: Sharp Kabushiki Kaisha, Osaka, Japan

[21] Appl. No.: 638,674

[22] Filed: Aug. 8, 1984

[30] Foreign Application Priority Data

Aug. 18, 1983 [JP] Japan .................................. 58-151009

[51] Int. Cl.⁴ .............................................. B32B 3/02
[52] U.S. Cl. ...................... 428/65; 369/282; 369/290
[58] Field of Search ................ 428/65, 137; 369/290, 369/282

[56] References Cited

U.S. PATENT DOCUMENTS

| | | | |
|---|---|---|---|
| 1,885,415 | 11/1932 | Collison | 369/290 |
| 2,654,816 | 10/1953 | Miessner | 369/284 |
| 4,470,137 | 9/1984 | Tago | 369/290 |
| 4,480,282 | 10/1984 | Brock et al. | 369/290 X |

*Primary Examiner*—Alexander S. Thomas
*Attorney, Agent, or Firm*—Birch, Stewart, Kolasch & Birch

[57] ABSTRACT

Concentric guide grooves are formed on a glass substrate, and recording medium is disposed on the glass substrate having the concentric grooves. A centering device is secured to the glass substrate in a manner that the center of the centering device is positioned at the center of the concentric guide grooves. In a preferred form, photopolymer is disposed between the centering device and the glass substrate as adhesive. The centering device is provided with an aperture through which ultraviolet rays are applyed to the photo-polymer to cure it.

13 Claims, 7 Drawing Figures

OPTICAL MEMORY DISC

BACKGROUND OF THE INVENTION

1. Field of the Invention

The present invention relates to an optical memory disc, upon which a laser beam is impinged so as to record, read out or erase information onto or from the optical memory disc.

2. Description of the Prior Art

Recently, an optical memory system has been developed, which optically stores information in high density and in mass storage order. In the optical memory system of the add-on-memory type or the erasable memory type, guide signals or guide addresses are normally recorded on the optical memory disc along circular guide grooves or along a spiral guide groove so as to control the optical beam position. In order to ensure an accurate operation, the concentricity of the guide grooves and a rotation center of the optical memory disc must be maintained at a high accuracy. If the rotation center of the optical memory disc is displaced from the center of the guide groove, the tracking operation becomes difficult due to whirling.

OBJECTS AND SUMMARY OF THE INVENTION

1. Objects of the Invention

Accordingly, an object of the present invention is to provide an optical memory disc of a novel construction.

Another object of the present invention is to enhance the concentricity of guide grooves and the rotation center of an optical memory disc of the add-on-memory type or the erasable memory type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

2. Summary of the Invention

To achieve the above objects, pursuant to an embodiment of the present invention, a centering device is attached to an optical memory disc at a position corresponding to the center of guide grooves formed in the optical memory disc. In a preferred form, a plurality of sections for transmitting ultraviolet rays are formed in the centering device, and photo-polymer is employed to attach the centering device to the optical memory disc. First, the center of the centering device is adjusted to the center of the guide grooves, and ultraviolet rays are impinged through the plurality of beam transmitting sections, thereby curing the photo-polymer so as to fix the centering device to the optical memory disc.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

An optical disc memory system generally includes an optical memory disc 10, a motor 12 for rotating the optical memory disc 10, an optical pickup 14, and a tracking mechanism 16 for shifting the optical pickup 14 in the radial direction. The optical pickup 14 includes a laser beam source, a lens system, a servo system for tracking/focusing purposes, and a beam detection system disposed therein.

Figure 2:
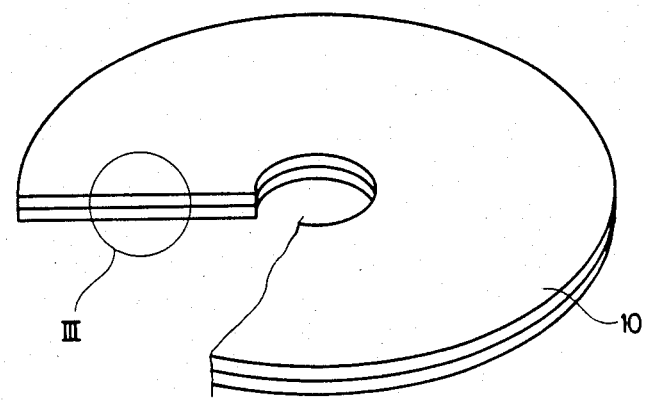
FIG. 2 is a partially cut-away perspective view of the conventional optical memory disc.
Figure 3:
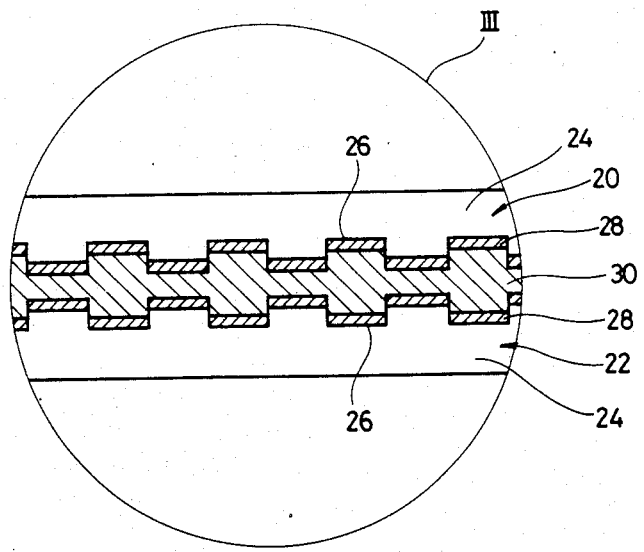
FIG. 3 is an enlarged sectional view of a portion III of the optical memory disc of FIG. 2.

The optical memory disc 10 generally has a double-sided structure, as shown in FIGS. 2 and 3, so as to increase the disc memory capacity. More specifically, the optical memory disc 10 generally includes a pair of recording plates 20 and 22. Each of the recording plates 20 and 22 includes a transparent substrate 24, guide grooves 26 formed in the transparent substrate 24, and recording medium 28 disposed on the transparent substrate 24. The two recording plates 20 and 22 are attached to each other through the use of adhesive 30 in a manner that the recording medium 28 of the respective recording plates 20 and 22 confronts each other.

The guide grooves 26 are important for conducting the tracking servo operation for the optical memory disc of the add-on-memory type and the erasable memory type. The guide grooves include a plurality of concentric circular grooves or a spiral groove formed in the transparent substrate 24. The guide grooves are formed in 1.5 through 3 $\mu$m pitch, and each groove has a width of 0.7 through 1 $\mu$m, and a depth of 500 through 800 Å. If the center of the guide grooves 26 is displaced from the center of the rotation of the optical memory disc 10, an accurate tracking operation can not be conducted.

Several methods have been proposed to form the guide grooves in the optical memory disc.

(1) A stamper having the stripe-shaped grooves formed thereon is employed to transcribe the stripe-shaped grooves onto a resin substrate made of, for example, acrylic or polycarbonate, through the use of the injection molding method.

(2) Photo-polymer is interposed between a grooved stamper and a substrate so as to transcribe the stripe-shaped grooves onto the photopolymer. The stamper is removed after the photo-polymer is cured (namely, 2P method).

(3) Resist is disposed on a glass substrate so as to transcribe the stripe-shaped grooves onto the resist. Then, the guide grooves are formed on the glass substrate by conducting the etching operation through the resist.

The third method is described in detail in copending U.S. patent application Ser. No. 606,534, "METHOD FOR MANUFACTURING AN OPTICAL MEM- ORY ELEMENT", filed on May 3, 1984, by Kenji OHTA, Junji HIROKANE, Hiroyuki KATAYAMA, Akira TAKAHASHI and Hideyoshi YAMAOKA, and assigned to the same assignee as the present application (European Patent Application No. 84303176.6, and Canadian Patent Application Ser. No. 453,843).

Even though a high concentricity is maintained in the concentric guide grooves in the conventional optical memory disc, there is a possibility that the center of the rotation of the optical memory disc is displaced from the center of the concentric guide grooves.

Figure 4:
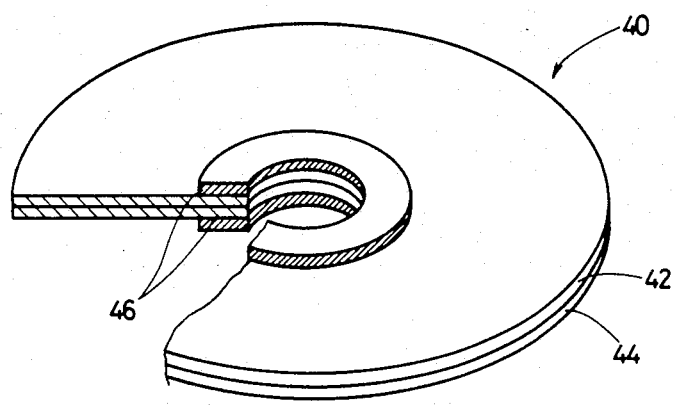
FIG. 4 is a partially cut-away perspective view of an embodiment of an optical memory disc of the present invention.

The present invention enhances the concentricity between the center of the guide grooves and the center of the rotation of the optical memory disc. FIG. 4 shows an embodiment of an optical memory disc of the present invention.

An optical memory disc 40 has the same construction as the optical memory disc 10 of FIGS. 2 and 3. That is, the optical memory disc 40 includes two glass substrates 42 and 44. A centering device 46 is secured to the glass substrates 42 and 44 while observing the concentricity of the guide grooves through the glass substrate 42 and 44.

Figure 5:
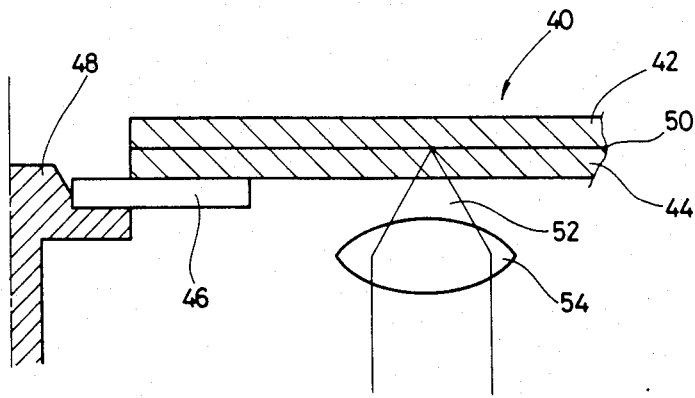
FIG. 5 is a sectional view for explaining a manufacturing step of the optical memory disc of FIG. 4.

FIG. 5 shows a method for securing the centering device 46 to the glass substrates 42 and 44. The optical memory disc 40 including the centering device 46 is mounted on a centering turntable 48. The guide grooves formed on the recording surface 50 of the glass substrates 42 and 44 are observed by impinging a laser beam 52 through the use of an object lens 54. The glass substrates 42 and 44 are rotated on the centering turntable 48 and the location of the glass substrates 42 and 44 is adjusted so that the center of the guide grooves formed on the glass substrates 42 and 44 becomes identical with the center of the rotation of the glass substrates 42 and 44. Then, the centering device 46 is secured to the glass substrates 42 and 44.

When two-part epoxy adhesive is employed to secure the centering device 46 to the glass substrates 42 and 44, the adhesive is first disposed between the centering device 46 and the glass substrates 42 and 44 before the optical memory disc is mounted on the centering turntable 48 because the adhesive requires a considerably long period to cure. The adhesive will gradually cure after completion of the centering adjustment.

Figure 1:
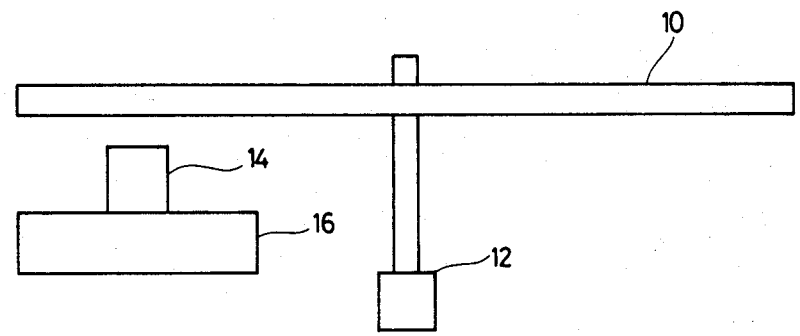
FIG. 1 is a schematic sectional view of an optical disc memory system.
Figure 6:
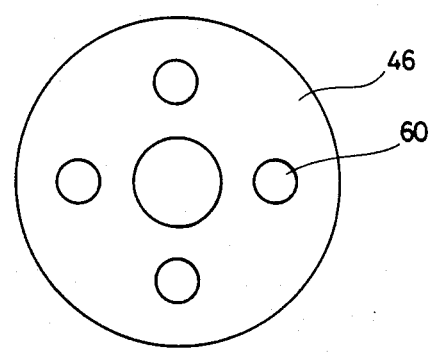
FIG. 6 is a plan view of an embodiment of a centering device employed in the optical memory disc of FIG. 4.
Figure 7:
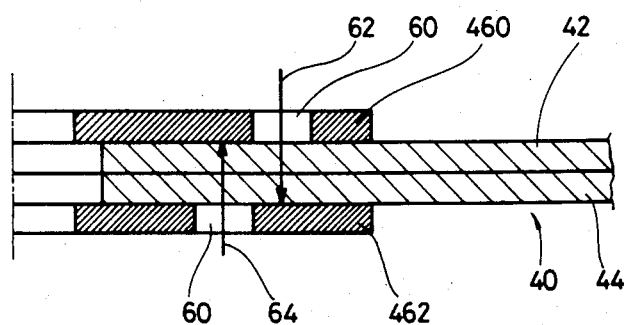
FIG. 7 is a sectional view for explaining a manufacturing step of the optical memory disc of FIG. 4.

Photo-polymer is effective ro reduce the period required for the centering operation. In this case, a plurality of light transmitting apertures 60 are formed in the centering device 46 as shown in FIG. 6. When the ultraviolet ray 62 is applied through the light transmitting aperture 60 formed in a centering device 460 as shown in FIG. 7, the ultraviolet ray 62 reaches the inner surface of the opposing centering device 462 through the glass substrates 42 and 44 so as to fix the centering device 462 to the glass substrate 44.

Further, the ultraviolet ray 64 is applied through the light transmitting aperture 60 formed in the centering device 462 so as to secure the centering device 460 to the glass substrate 42. Of course, the recording medium should not be disposed on the glass substrates 42 and 44 at the position where the ultraviolet rays 62 and 64 pass.

The light transmitting apertures 60 can be formed at desired positions in a desired configuration. In a preferred form, the light transmitting apertures are shaped in a symbol pattern showing the manufacturer of the otical memory disc. In another preferred form, anaerobic photo-polymer is employed as the adhesive. In this case, the anaerobic photo-polymer gradually cures at positions where the ultraviolet rays 62 and 64 are not applied, thereby tightly fixing the centering device 46 to the glass substrates 42 and 44.

The centering device 46 (460 and 462), further, functions to protect the center opening edge of the glass substrates 42 and 44. The diameter of the center opening of the centering device 46 (460 and 462) must be smaller than the diameter of the center opening of the glass substrates 42 and 44.

In case the turntable for the optical memory disc is the magnetic attracting type, the centering device can be made of ferromagnetic material such as iron. Ni or Cu is preferably plated on the iron centering device in order to prevent the rust.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical memory disc comprising:
 a substrate having central circular aperture of a predetermined size;
 plurality of concentric information tracks formed on said substrate;
 a centering device having a central circular aperture of a size less than the predetermined size of the aperture of said substrate secured to said substrate in a manner that the center of said centering device is positioned at the center of said concentric information tracks; and
 a photo-polymer adhesive interposed between said substrate and said centering device to secure said centering device to said substrate.

2. The disc of claim 1 wherein said substrate is formed of glass.

3. The optical memory disc of claim 1 wherein said concentric information tracks are formed by a recording medium formed on said substrate and defined by concentric guide grooves also formed on said substrate.

4. An optical memory disc comprising:
 a substrate having a central aperture of a predetermined size;
 a spiral guide groove formed on said glass substrate;
 an optical memory recording medium disposed on said glass substrate having said spiral guide groove formed thereon;
 a centering device having a central aperture of a size smaller than said predetermined size of the aperture of said glass substrate located adjacent to said glass substrate in a manner that the center of said central aperture of said centering device is positioned at the center of said spiral guide groove; and
 a photo-polymer adhesive disposed between said centering device and said substrate to form a bond therebetween.

5. The optical memory disc of claim 4, wherein said central aperture is shaped in a desired symbol pattern.

6. The disc of claim 4 wherein said substrate is formed of glass.

7. An optical memory disc comprising:
 a first substrate;
 a second substrate in juxtaposition with a surface of said first substrate with each substrate having a central aperture of a single predetermined size;
 information tracks on each of said first and second substrates;

a first centering device affixed to said first substrate, said centering device having a central aperture whose diameter is smaller than said predetermined size;

a second centering device affixed to said second substrate said centering device having a central aperture whose diameter is smaller than said predetermined size;

wherein said first and second centering devices are affixed in such a manner that the centers of their said apertures are positioned at the center of said information tracks;

further comprising a photo-polymer adhesive interposed between each said substrate and its associated said centering device.

8. The optical memory disc of claim 7 wherein said information tracks are formed by a recording medium formed on each of said first and second substrates and defined by concentric guide grooves formed on each of said first and second substrates.

9. The optical memory disc of claim 7 wherein said information tracks are formed by a recording medium formed on each of said first and second substrates and defined by first and second spiral guide grooves also formed on said first and second substrates, respectively.

10. The optical memory disc of claim 7 wherein said first and second substrates are formed of glass.

11. The optical memory disc of claim 7 wherein said apertures of said substrates are circular.

12. The optical memory disc of claim 11 wherein said aperatures of said centering devices are circular.

13. The optical memory disc of claim 7 wherein said additional apertures are of a desired pattern.

* * * * *